(12) United States Patent
Peterson et al.

(10) Patent No.: US 10,010,091 B2
(45) Date of Patent: *Jul. 3, 2018

(54) FREEZE-DRIED, DAIRY OR DAIRY-SUBSTITUTE COMPOSITIONS AND METHODS OF USING SAME

(75) Inventors: Scott Peterson, Spring Lake, MI (US); Frank Welch, Kentwood, MI (US); Thomas Burkholder, East Amherst, NY (US); Norman Jager, Albany, OR (US); Giovanna Aleman, Corvallis, OR (US)

(73) Assignee: Nestec S. A., Vevey (CH)

( * ) Notice: Subject to any disclaimer, the term of this patent is extended or adjusted under 35 U.S.C. 154(b) by 116 days.

This patent is subject to a terminal disclaimer.

(21) Appl. No.: 13/190,219

(22) Filed: Jul. 25, 2011

(65) Prior Publication Data

US 2011/0280989 A1    Nov. 17, 2011

Related U.S. Application Data

(63) Continuation of application No. 12/482,256, filed on Jun. 10, 2009, now abandoned, which is a continuation-in-part of application No. PCT/US2008/063312, filed on May 9, 2008.

(60) Provisional application No. 60/916,949, filed on May 9, 2007.

(51) Int. Cl.
*A23C 9/13* (2006.01)
*A23C 1/08* (2006.01)
*G06Q 99/00* (2006.01)

(52) U.S. Cl.
CPC ............. *A23C 9/1307* (2013.01); *A23C 1/08* (2013.01); *A23C 9/1315* (2013.01); *G06Q 99/00* (2013.01); *A23C 2210/30* (2013.01)

(58) Field of Classification Search
USPC ..... 426/21, 565, 34, 61, 580, 564, 570, 583, 426/654, 384
See application file for complete search history.

(56) References Cited

U.S. PATENT DOCUMENTS

| | | |
|---|---|---|
| 3,313,032 A | 4/1967 | Malecki |
| 4,080,477 A | 3/1978 | Tsumara et al. |
| 4,542,035 A | 9/1985 | Huang et al. |
| 4,624,853 A | 11/1986 | Rudin |
| 4,631,196 A | 12/1986 | Zeller |
| 4,851,239 A | 7/1989 | Amen et al. |
| 4,855,155 A | 8/1989 | Cavallin |
| 4,956,185 A | 9/1990 | Cajigas |
| 5,093,137 A | 3/1992 | Shazer, Jr. et al. |
| 5,147,668 A | 9/1992 | Munk |
| 5,176,928 A | 1/1993 | Shazer, Jr. et al. |
| 5,451,419 A | 9/1995 | Schwab et al. |
| 5,518,740 A | 5/1996 | Costanzo et al. |
| 6,183,803 B1 | 2/2001 | Morcol et al. |
| 6,998,146 B2 | 2/2006 | Murphy et al. |
| 7,005,157 B2 | 2/2006 | Engesser et al. |
| 7,005,175 B2 | 2/2006 | Hachenberg et al. |
| 7,011,861 B2 | 3/2006 | Nair |
| 7,033,634 B2 | 4/2006 | Engesser et al. |
| 2003/0194468 A1 | 10/2003 | Konkoly et al. |
| 2003/0224089 A1 | 12/2003 | Engesser et al. |
| 2006/0286209 A1 | 12/2006 | Sweley et al. |
| 2009/0324773 A1 | 12/2009 | Peterson et al. |
| 2011/0183041 A1 | 7/2011 | Barniol et al. |

FOREIGN PATENT DOCUMENTS

| | | |
|---|---|---|
| CA | 2183168 | 9/1995 |
| CA | 2 546 423 | 7/2005 |
| DE | 1 149 975 | 6/1963 |
| DE | 2 262 672 | 8/1973 |
| EP | 0 118 048 | 9/1984 |
| EP | 0 166 600 | 1/1986 |
| EP | 0 649 599 | 4/1995 |
| EP | 0 897 670 | 2/1999 |
| EP | 1 048 216 | 11/2000 |
| EP | 1 075 798 | 2/2001 |
| EP | 1 369 041 | 12/2003 |
| EP | 1 430 785 | 6/2004 |
| FR | 1190044 | 10/1959 |
| FR | 2079766 | 11/1971 |
| FR | 2620904 | 3/1989 |
| GB | 1 070 060 | 5/1967 |
| GB | 1 343 640 | 1/1974 |
| GB | 1 484 167 | 9/1977 |
| JP | 55-159752 | 12/1980 |
| JP | 07-079696 | 3/1995 |
| JP | 2004-222673 | 8/2004 |
| JP | 2005-053049 | 3/2005 |
| WO | 89/12407 | 12/1989 |
| WO | 95/05085 | 2/1995 |
| WO | 99/00021 | 1/1999 |

(Continued)

OTHER PUBLICATIONS

Astronaut Ice Cream. Found on http://www.thespacestore.com/asicecream.html. Printed on Thursday, Aug. 27, 2009 at 2:44PM.
Garcia, et al., "Lowfat Ice Creams from Freeze-Concentrated Versus Heat-Concentrated Nonfat Milk Solids," 1995, J. Diary Sci, 78:2345-2351.
Gerber Graduates Mini Fruits Snacks. Found on http://www.gerber.com/Products/Mini_Fruits.aspx#. Printed on Thursday, Aug. 27, 2009 at 2:23PM.
Hartel, et al., "Freeze Concentration of Skim Milk," Journal of Food Engineering 20 (1993) 101-120.
Kumeno, et al., "Production and Characterization of a Pressure-induced Gel from Freeze-concentrated Milk," Biosci. Biotech. Biochem., 57 (5), 750-752, 1993.

(Continued)

*Primary Examiner* — D. Lawrence Tarazano
*Assistant Examiner* — Stephanie A Cox
(74) *Attorney, Agent, or Firm* — Gary M. Lobel, Esq.

(57) ABSTRACT

The present invention comprises a freeze-dried, dairy or dairy-substitute composition comprising a dairy or dairy-substitute ingredient and an emulsifier and methods of using same to promote and/or improve child development.

18 Claims, No Drawings

(56) References Cited

FOREIGN PATENT DOCUMENTS

| | | |
|---|---|---|
| WO | 00/65935 | 11/2000 |
| WO | 01/62099 | 8/2001 |
| WO | 03/028471 | 4/2003 |
| WO | 03/086092 | 10/2003 |
| WO | 03/096816 | 11/2003 |
| WO | 2005/096833 | 10/2005 |
| WO | 2006/017363 | 2/2006 |
| WO | 2006/099553 | 9/2006 |

OTHER PUBLICATIONS

Mohamed, et al., "Hard Cheese Making From Camel Milk," Milchwissenschaft 45 (11) 1990, 716-719.

FREEZE-DRIED, DAIRY OR DAIRY-SUBSTITUTE COMPOSITIONS AND METHODS OF USING SAME

CROSS-REFERENCE TO RELATED APPLICATIONS

This application is a continuation of U.S. Ser. No. 12/482,256, filed Jun. 10, 2009, which is based upon and claims the benefit of priority from International Application No. PCT/US08/063,312, filed on May 9, 2008, which claims priority to U.S. Ser. No. 60/916,949, filed on May 9, 2007, the entire contents of which are incorporated herein by reference.

BACKGROUND

Aerated milk compositions, such as aerated yogurt products are known in the art. Aeration can provide desirable characteristics such as light, fluffy textures. It is also known in the art that aerated products are subject to physical and chemical instability and therefore can destabilize over time. One solution to such instability issues in aerated milk-based products includes the addition of a hydrated emulsifier to already cultured dairy products before aeration (See e.g. U.S. Pat. No. 7,005,157, hereinafter "the '157 patent"). Specifically, the '157 patent teaches against adding ingredients directly to the milk blend prior to fermentation because such ingredients can adversely affect processing considerations such as fermentation times. The '157 patent teaches that the addition of a hydrated emulsifier post-fermentation avoids adversely lengthening fermentation times while contributing to stability. Freeze-drying is a process well known in the food industry. It is critical in further drying aerated products that the resulting product retain sensory attributes that are important to consumers. Using the invention taught in the '157 patent, hydration of the aerated product before freeze-drying can detrimentally affect physical stability. For example, a hydrated, aerated product when freeze-dried may result in increased fragility during shipping and handling of the product.

As a further example, dissolvability is an important issue in a freeze-dried product. Specifically, the aerated product, which has been dried and treated with air, nitrogen or other gases, must still remain readily dissolvable upon consumption at such a rate as to transfer flavor to the consumer's taste buds. Moreover, the product should be readily dissolvable to reduce the risk of choking hazards for consumers with restricted or under-developed oral motor skills or digestive functions. As a known solution, increasing the aeration can improve dissolvability. However, increased aeration has the negative effect of reducing the hardness of the end product. When the hardness is reduced beyond a certain level, the physical stability of product can be compromised.

Therefore, there is a need for a product that is freeze-dried and aerated that has improved physical stability and improved dissolvability.

SUMMARY

The present invention comprises, in part, a freeze-dried, dairy or dairy-substitute composition comprising a dairy or dairy-substitute ingredient, an emulsifier, wherein said dairy or dairy-substitute composition is pasteurized, and methods of using and making same. In an embodiment, the composition is aerated. The present invention, in an embodiment, relates to yogurt products and compositions and methods of using same to promote and/or improve child development.

By way of example, the present invention provides a method of promoting child development comprising the step of providing a nutritious freeze-dried shelf stable snack comprising yogurt and having developmentally appropriate size and dissolution properties.

Additional features and advantages are described herein, and will be apparent from the following Detailed Description.

DETAILED DESCRIPTION

As used throughout, ranges are used as a shorthand for describing each and every value that is within the range. Any value within the range can be selected as the terminus of the range. When used, the phrase "at least one of" refers to the selection of any one member individually or any combination of the members. The conjunction "and" or "or" can be used in the list of members, but the "at least one of" phrase is the controlling language. For example, at least one of A, B, and C is shorthand for A alone, B alone, C alone, A and B, B and C, A and C, or A and B and C.

"Freeze-dry" is a dehydration process that works by freezing the material and then reducing the surrounding pressure to allow the frozen water in the material to sublimate directly from the solid phase to gas.

"Aeration" is the process of introducing air to increase gas concentration in liquids. Aeration may be performed by bubbling a gas through the liquid, spraying the liquid into the gas or agitation of the liquid to increase surface absorption.

"Dissolvability" is defined as the change in hardness of a product in going from a dry to a wet state.

"Hardness" is defined as the peak stress prior to fracturing a material. Universal Tester model 4465 with 100 N static load cell, manufactured by Instron in Canton, Mass., is used. The probe used for testing is a compression anvil #2830-011. Initial settings for speed of probe were 1 mm/second to approximately 90% compression. Speed based upon journal article in J. Texture Studies, 36 (2005), pp 157-173, "Effects of Sample Thickness of Bite Force for Raw Carrots and Fish Gels." Testing is repeated on 10-15 replicate samples for each variable.

"Viscosity" is defined as a measure of the resistance of a substance to flow. Viscosity is measured using a Brookfield viscometer with a Helipath® stand with an F-T bar before the composition is aerated. Viscosity aids in holding the shape of a substance through aeration and deposit.

The present invention comprises, in part, a dairy or dairy substitute composition useful in the preparation of a freeze-dried, aerated product. The first component of the composition comprises a dairy or dairy substitute ingredient. The dairy or dairy substitute ingredient is selected from any dairy or dairy substitute ingredient ordinarily known in the art. Specifically, the dairy ingredient is selected from the group including but not limited to milk, milk powder, yogurt, skim milk and milk proteins and combinations thereof. The dairy substitute ingredient is selected from but not limited to soy proteins and rice proteins and combinations thereof. The dairy or dairy substitute ingredient is present in amount of from 50% to 98%, preferably from 60% to 90% and most preferably from 70% to 85% of the composition.

The second component of the present composition comprises an emulsifier. While not wishing to be bound by any theories, it is believed that the emulsifier reduces the surface tension at the air-liquid interface, therefore allowing for stable dispersion of air bubbles within the viscous liquid matrix. The emulsifier is preferably a lactylated mono and diglyceride. The lactylated mono and diglyceride is selected from the group consisting of but not limited to lactic and citric acid esters of mono- and diglycerides, distilled monoglycerides, and combinations thereof. While not wishing to be bound by any theories, it is believed that the lactic acid stays in the water phase and the monoglycerides stay in the hydrophobic phase for whipping agent. The lactylated mono and diglycerides are present in an amount of from 0.001 to 1%, preferably from 0.01 to 0.5% and most preferably from 0.1 to 0.4% of the composition. It is believed that the lactylated mono and diglyceride component of the present invention promotes stabilization of the final aerated composition.

The combination of the first component and the second component are then pasteurized through procedures commonly used in the industry. Pasteurization can take between 1 to 10 minutes between 170 F to 210 F, preferably between 180 F to 205 F.

The composition of the present invention can further comprise optional ingredients such as starch, including but not limited to corn starch, rice starch (native, physically or chemically modified) and tapioca starch; sugar/sweeteners, stabilizers, flavors, colors, fruit purees, prebiotics, probiotics, vegetable purees, fibers, fortificants such as DHA, minerals and vitamins, and gelatins such as porcine, fish and bovine.

In an embodiment, the composition of the present invention comprises a yogurt product. The yogurt product can be a freeze-dried aerated product that can be designed to promote or improve child development.

Hardness, Dissolvability and Viscosity

The consumer preference for the final product of the present invention is believed to be based on physical characteristics such as hardness, viscosity and dissolvability. While each characteristic is important, the correct balance between the three components is desired to optimize the end product of the present invention. Viscosity is defined as a measure of the resistance of a substance to flow. Viscosity is measured using a Brookfield viscometer with a Helipath® stand with an F-T bar before the composition is aerated. It is believed that while the viscosity aids in holding the shape of a substance through aeration and deposit, the hardness aids in physical stability. The dissolvability, also a hardness measurement, is the change in hardness of a product in going from a dry to a wet state. With increased aeration, which aids in dissolvability, the hardness can be negatively affected. The compositions and methods of the present invention have unexpectedly discovered the optimum balance between viscosity, hardness and dissovability to provide a physically stable and consumer acceptable product.

The composition of the present invention has a hardness value of from 0.5 to 8 pounds force, preferably from 1.5 to 5.5 peak load. Peak load force can be measured using an Instron Universal Testing Machine fitted with a 100 N load cell and a #2830-011 compression anvil. The traveling is at a speed of 1 mm/sec until initial piece fraction occurs.

The composition of the present invention has a dissolvability in the range of from 0.1 to 8 peak load, preferably from 0.1 to 30 pounds force.

The composition of the present invention has a viscosity of from 1,000 to 150,000 cp, dependent upon the temperature and speed of the viscometer used to measure the viscosity. In the preferred embodiment, the viscosity of the wet composition ranges from 30,000 to 60,000 cp at a 10 RPM speed of the spindle 6 in a Brookfield Viscometer. The most preferred range is from 35,000 to 50,000 cp. In an alternate embodiment, the present invention has a viscosity of from 1,000 to 700,000 cp, dependent upon the temperature and speed of the viscometer used to measure the viscosity. In the preferred embodiment for the alternate embodiment, the viscosity of the wet composition ranges from 100,000 to 400,000 cp at a 5 RPM speed of the spindle 6 in a Brookfield Viscometer. The most preferred range for the alternate embodiment is from 200,000 to 350,000 cp. It should be noted that the viscosity can be adjusted based on the RPM and is dependent upon dissolvability and the stabilizer.

METHOD OF MAKING

A method of preparing a freeze-dried, aerated, milk product comprising the steps of (a) providing a dairy or dairy substitute blend, (b) adding an emulsifier, (c) thermally processing the dairy or dairy substitute blend, (d) fermenting the blend, (e) admixing a gas with the blend; (f) simultaneously aerating the gas and the dairy or dairy substitute blend to form an aerated product, and (f) cooling the product; and (g) freeze-drying the product.

It should be noted that the product does not need to be aerated but can have added volume by diluting the blend so it is not as thick and then freeze drying the blend. This will cause the resultant product to have increased volume.

Yogurt Production:

1. Pasteurized lowfat milk is transferred from a tanker truck to large hold tank.

2. All dry ingredients (sugar, gelatin, starch, nonfat dry milk, emulsifier, as well as functional ingredients such as prebiotics) are incorporated into milk via addition to a high shear blender (such as Bredo Liqwifier) to achieve homogenous dispersion and initial hydration.

3. Once all dry ingredients have been incorporated, the mixture is agitated for 30 minutes at 35-38 F.

4. Following agitation, the mixture is transferred to the HTST plate heat exchanger for thermal processing. The thermal process conditions used require that all achieve and maintain a minimum temperature of 191 deg F. at the end of a 4.5 minutes hold time. This temperature and hold time can vary depending upon the mechanics of the process, for example it is possible to go slightly higher in temperature and have a 7 or 8 minute hold time.

5. As an optional step for optimizing the formula and the consistency of aeration, homogenizing of the mixture can occur. The typical homogenization pressures are 2000 to 2500 psi at a first stage and 200-600 psi at a second stage.

6. After the hold time at 191 deg F., the mix is cooled to 100-112 deg F., and transferred to the culturing vat. At this point, the yogurt culture is added (for example, a freeze-dried culture, ABY-2C, supplied by Danisco Ingredients, or other vendors). The culture is blended with the pasteurized mix for 30-60 minutes, the mixing is stopped and the vat is maintained at 104-107 deg F. for 4-6 hours. Yogurt is allowed to acidify to pH 4.5 to 4.6, and is then agitated (broken) and cooled to 60 deg F. in the culture tank. Final pH will range from is 4.1-4.4.

7. Yogurt is transferred to 250 gal. blending tanks by pumping through a cooling press, which lowers temp to 37-45 deg F. Pasteurized fruit puree, flavors and any desired color will be added. Mixture will be blended with gentle agitation and recirculation for 10-15 minutes. Blended fruit yogurt is transferred to 275 gallon totes.

Production Frozen Yogurt Drops

1. Yogurt will be conveyed/pumped from 275 gallon totes (previously stored at 34-40 deg F.) to the aerator (in this case, a Mondomix aerator, although other brands exist).

2. Nitrogen gas is admixed to the yogurt via the Mondo mixer (connected to plant ice water circulation system, to maintain mixing head temperature at 35-45 deg F.). Product overrun can range from 20% to 80%. However, preferably, the overrun target will be between 30% and 50% and most preferably between 35% and 45%. This process happens continuously.

3. Aerated yogurt is pumped, maintained at 38-50 deg F., under pressure, to a depositor manifold, where it is distributed to multiple nozzles which, via a metering pump, create the appropriately shaped deposit form (in this case, a large chocolate chip shape, although other shapes/forms are possible). The current target shape has a diameter of 13-22 mm (ideal is 15-20 mm), a height of 7-12 mm (ideal is 8-10), and a weight of 0.8-1.3 grams (ideal is 1.0-1.1 g).

4. Drops are deposited onto a solid, stainless steel freezer belt (in this case, the maker of the belt and freezer is Sandvik).

5. Freezer tunnel air temperature is approximately −20 to −30 deg F., with high velocity air circulation. Dwell time in the tunnel can range from 3-5 minutes. Frozen pieces exit the tunnel with an internal temperature of 24-28 deg F.

6. Products are removed from the freezer belt and conveyed to a bulk case packer, where they are filled into 20-30 lb, plastic bag lined cases. Cases are closed, taped and stored at −20 deg F. until shipment to OFD.

The following composition of the present invention can be prepared. The percentages listed are based on the total weight of the composition.

Example 1: Unflavored Yogurt

| Ingredient | Percentage by weight |
| --- | --- |
| Low fat Milk | 82.89 |
| Non-fat dry milk (NFDM) | 4 |
| Sugar | 9 |
| Starch/Gelatin Stabilizer Blend | 3.7 |
| Yogurt Culture + Skim Milk | 0.01 |
| Lactem Emulsifier (Lactic Acid Esters of Monoglycerides) | 0.4 |

Example 2

| Ingredient | % of formula |
| --- | --- |
| Lowfat Milk (1.65% fat) | 78.442148 |
| NFDM Low Heat | 3.68628 |
| Sugar, White Satin | 8.5068 |
| Starch/Gelatin Stabilizer Blend (0.38% Lactem, 1.1% Tapioca Starch, 2.3% gelatin | 3.87532 |
| Peach Puree, Single Strength, Frozen, Organic | 5 |
| Natural Peach Flavor | 0.3 |
| Natural Annatto Extract | 0.18 |
| Yogurt Culture | 0.009452 |
| TOTAL | 100 |

Example 3

| Ingredient | % of final formula |
| --- | --- |
| Lowfat Milk (1.65% fat) | 78.442148 |
| NFDM, Low Heat | 3.68628 |
| Sugar, White Satin | 8.5068 |
| Starch/Gelatin Stabilizer Blend #1795 | 3.87532 |
| Peach Puree, Single Strength, Frozen, Organic | 5 |
| Natural Peach Flavor WONF C13206 | 0.3 |
| Natural Annatto Extract 1211663 | 0.18 |
| Yogurt Culture ABY-2C | 0.009452 |
| TOTAL | 100 |

The composition described above is made using the methods described herein.

Yogurt Snack Product

The present invention provides, in part, a healthy nutritious snack. The snack can be specifically constructed to assist in the development of children or other individual or class of consumer. In an embodiment, the yogurt snack is an aerated freeze-dried milk-based yogurt having melting properties. A variety of ingredients can be used in the yogurt product including probiotics as well as fruit.

As noted above, the product can be freeze dried into a variety of shapes, for example, yogurt drops. However, depending on the intended consumer, a variety of other products can be provided as well as sizes, volumes, and shapes to meet the consumer's nutritional needs.

In this regard, for a child, it is envisioned that the snack product would be provided in a single serving unit as follows:

0.1 ounce to 1 ounce;

15 caloric content to 90 caloric content;

$1 \times 10^4$ cfu/g to $1 \times 10^{10}$ cfu/g yogurt starter culture organisms and/or probiotic organisms (L. acidophilus, L. reuteri, L. rhamnosus, L. paracasei, Bifidobacteria sp., L. johnsonii, and the like); and the product could be packaged in a container with adequate moisture and oxygen barrier properties (pouch and/or plastic cup and/or glass and/or metal container) to prevent moisture absorption (water activity >0.35) or oxidation during extended storage periods, e.g., greater than 3 months.

By way of example, an example of a child product is as follows: the product would be designed to be a one cup 7 gram serving size. The product can be packaged so as to provide, for example, 4 servings per container. Per serving, the product can provide 30 calories with no calories from fat. The product would preferably include live and active cultures and fruit. The product is easy to chew and swallow and has no preservatives, artificial flavors, or artificial sweeteners. The product provides up to 99% real yogurt and fruit.

This product would provide a nutritious snack for a child (crawler and up), a crawler has a minimum age of 7 months. To this end, the product would provide a more nutritious snack than a number of snacks typically provided to children because it is a source of wholesome dairy/yogurt/fruit ingredients such as calcium, protein, vitamin A, vitamin D, vitamin C, as well as bacteria which may be beneficial to digestive and immune health (yogurt starters, probiotics, etc.).

As used herein, the term "sized and shaped for a child" means the child can easily pick up the piece with small fingers that are still developing their pincer grasp and other fine motor skills. Once grasped, the freeze dried yogurt surface texture can be readily retained in the child's fingers due to the shape. Once consumed, the easily dissolvable texture allows the crawler aged child to practice roll and fine motor skills in the mouth without the need to chew (a skill which children at this age may not have yet developed). An example of a shape that fits these criteria would be a conical rain drop like shape with a base diameter of 12 mm to 25 mm, a height of 4 mm to 15 mm and a piece weight of 0.05 g to 0.45 g.

An advantage of the present invention is that it provides a snack that is shelf stable, aerated and, in an embodiment, comprises viable probiotics/active cultures.

Furthermore, not only does the present invention provide a convenient toddler or children friendly snack, it provides an on the go snack. Thus, the product can be provided in a toddler's or child's lunch or provided to the toddler or child as a snack that can be ingested at any time and in almost any environment.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of making a shelf stable snack comprising the sequential steps of:
    (a) adding a dry emulsifier directly to one or more dairy or dairy substitute ingredients and mixing the dry emulsifier and the dairy or dairy substitute ingredient(s) via high shear blending to form an emulsifier-containing blend, wherein the dry emulsifier consists of lactylated monoglycerides and/or lactylated diglycerides;
    (b) pasteurizing the emulsifier-containing blend, thereby forming a pasteurized blend;
    (c) adding a yogurt culture to the pasteurized blend and blending the pasteurized blend and the yogurt culture;
    (d) fermenting the pasteurized blend containing the yogurt culture, thereby forming a fermented blend;
    (e) admixing a gas with the fermented blend to form an aerated product;
    (f) freeze drying portions of the aerated product, thereby forming the snack;
    (g) packaging the snack for consumption by a child; and
    wherein the dairy or dairy substitute ingredient(s) is present in an amount from about 70% to about 85% by weight of the snack, and wherein the snack has a hardness value of from 0.5 to 8 pounds force peak load.

2. The method of claim 1, wherein the snack has a dissolvability in the range of from 0.1 to 8 pounds force peak load.

3. The method of claim 1, wherein the dairy or dairy substitute ingredient(s) is selected from the group consisting of milk, milk powder, yogurt, skim milk, milk proteins, and combinations thereof.

4. The method of claim 1, wherein the viscosity of the snack is from 1000 to 500,000 cp.

5. The method of claim 1, wherein the snack is a freeze-dried, dairy product.

6. The method of claim 1, wherein the snack is a freeze-dried, yogurt product.

7. The method of 1, wherein the snack comprises probiotics.

8. The method of claim 1, wherein the snack is sized and shaped for a child such that a child can easily pick up the snack with small fingers that are still developing their pincer grasp and other fine motor skills, wherein the snack is in a conical raindrop shape with a base diameter of 12 mm to 25 mm, a height of 4 mm to 15 mm and a piece weight of 0.05 g to 0.45 g.

9. The method of claim 1, wherein the snack is sized and shaped for ease of use by a child at the stage of development when the child is able to begin to chew solid foods.

10. The method of claim 9, wherein the diameter and height of the snack is adapted to allow a child to self-feed.

11. The method of claim 1, wherein the snack dissolves in a person's mouth upon contact with saliva.

12. The method of claim 1, wherein the dry emulsifier consists of lactic acid esters of monoglycerides (LACTEM).

13. The method of claim 1, wherein the emulsifier is present in an amount from 0.001% to 1% by weight of the snack.

14. The method of claim 1, further comprising the step of homogenizing the pasteurized blend at a homogenization pressure in a range of from 2,000 to 2,500 psi.

15. The method of claim 1, wherein in step (e), the gas is admixed with the fermented blend to provide an overrun in a range of from 20% to 80% prior to freeze-drying.

16. The method of claim 1, wherein in step (b), the emulsifier-containing blend is pasteurized by heating at a temperature in a range of from 170'F to 210° F. for 1 to 10 minutes.

17. The method of claim 1, wherein in step (d), the pasteurized blend is fermented at a temperature in a range of from 104° F. to 107° F. for 4 to 6 hours.

18. A method of making a shelf stable snack comprising the sequential steps of:
    (a) adding a dry emulsifier directly to one or more dairy or dairy substitute ingredients and mixing the dry emulsifier and the dairy or dairy substitute ingredient(s) via high shear blending to form an emulsifier-containing blend, wherein the dry emulsifier consists of lactic acid esters of monoglycerides (LACTEM);
    (b) pasteurizing the emulsifier-containing blend by heating at a temperature in a range of from 170° F. to 210° F. for 1 to 10 minutes, thereby forming a pasteurized blend;
    (c) adding a yogurt culture to the pasteurized blend and blending the pasteurized blend and the yogurt culture;
    (d) fermenting the pasteurized blend at a temperature in a range of from 104° F. to 107° F. for 4 to 6 hours, thereby forming a fermented blend;
    (e) admixing a gas with the fermented blend to form an aerated product;
    (f) freeze drying portions of the aerated product forming the snack;
    (g) packaging the snack for consumption by a child; and
    wherein the dairy or dairy substitute ingredient(s) is present in an amount from 70% to 85% by weight of the snack, wherein the emulsifier is present in an amount from 0.001% to 1% by weight of the snack, and wherein the snack has a hardness value of from 0.5 to 8 pounds force peak load.

* * * * *